UNITED STATES PATENT OFFICE.

J. F. RICH, OF CHATHAM RUN, PENNSYLVANIA.

IMPROVED PROCESS FOR THE MANUFACTURE OF FULLER'S SOAP.

Specification forming part of Letters Patent No. 46,143, dated January 31, 1865.

*To all whom it may concern:*

Be it known that I, J. F. RICH, of Chatham Run, in the county of Clinton and State of Pennsylvania, have invented a new and Improved Fuller's Soap; and I do hereby declare that the following is a full, clear, and exact description of the same.

The nature of this invention consists in a soap made of the liquor in which wool and card-strippings or card-strippings mixed with other greasy waste have been scoured, said liquor being treated with potash, lye, soda-ash, or other saponifier, and, if necessary, mixed with an additional quantity of fatty matter if not sufficient fat should be obtained from the scouring process.

In carrying out my invention I place the water in which the scouring is to be performed in a suitable vessel and heat the same. Instead of skimming the fatty or greasy matter which arises to the surface and saving it for soap, as is usually done, I introduce into the liquor, after the material to be scoured has been removed, an additional quantity of the lye of potash, soda-ash, or other saponifier which had been used in the scouring process, is introduced, over and above the quantity previously used for the purpose of scouring, and this addition of alkaline matter is continued until the fatty matter or other residuum of the scouring process is fully digested. In some cases it may also be found necessary to add some fatty matter to the scouring-liquor in order to produce soap of a proper consistency.

In order to render the liquor rich or strong with the soap constituents, a squeezer or press may be used to force the free liquor from the wool-waste or card-strippings after the same have been scoured.

If desired, in my process the liquor may be used in which wool has been scoured with the use of salt.

I claim as new and desire to secure by Letters Patent—

A soap made by treating the liquor in which wool and card strippings or other greasy waste have been scoured with salt, alkalies, or other saponifiers, substantially in the manner herein set forth.

J. F. RICH.

Witnesses:
    R. J. ARMSTRONG,
    CHARLES CORSS.